Aug. 24, 1926.

C. A. HARTFIEL

ANTISKID CHAIN

Filed Jan. 22, 1924 2 Sheets-Sheet 1

1,597,596

WITNESSES

INVENTOR
CHARLES A. HARTFIEL
BY
ATTORNEYS

Aug. 24, 1926.
C. A. HARTFIEL
ANTISKID CHAIN
Filed Jan. 22, 1924
1,597,596
2 Sheets-Sheet 2
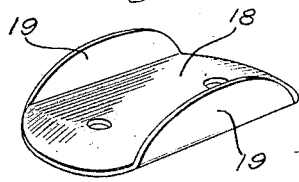
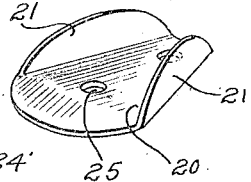
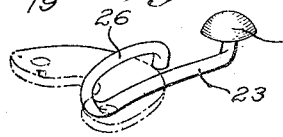
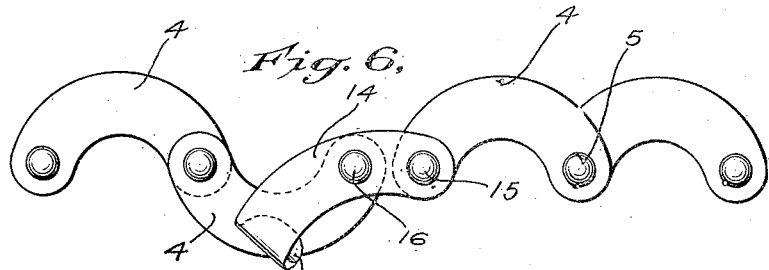
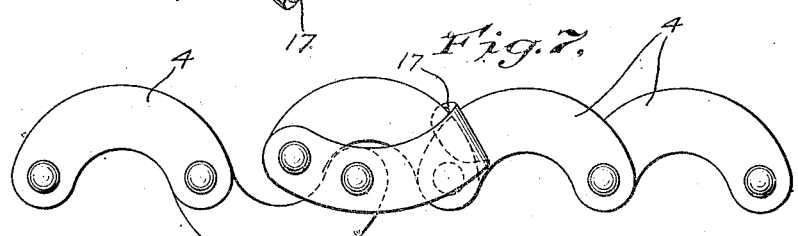
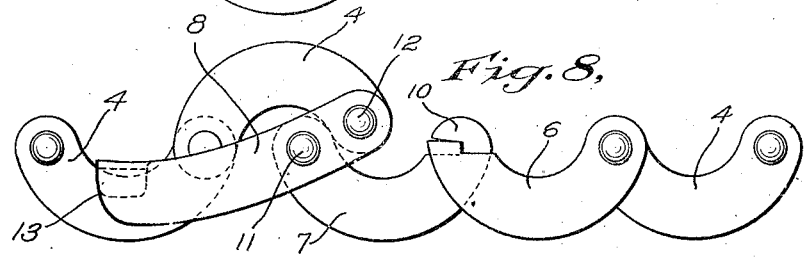
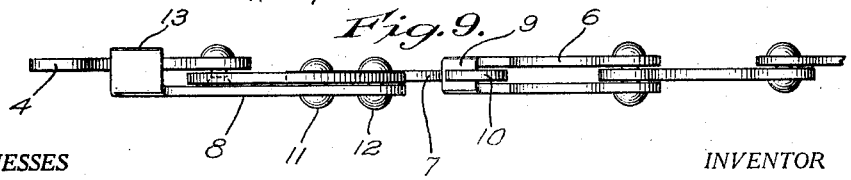
WITNESSES
INVENTOR
CHARLES A. HARTFIEL
BY
ATTORNEYS Patented Aug. 24, 1926.

1,597,596

UNITED STATES PATENT OFFICE.

CHARLES A. HARTFIEL, OF NEW YORK, N. Y.

ANTISKID CHAIN.

Application filed January 22, 1924. Serial No. 687,871.

This invention relates to improvements in anti-skid chains and more particularly to chains for use on tires such, for example, as automobile tires.

An object of the invention is to provide a chain which can be readily adjusted to fit any ordinary tire and which provides means for taking up slack in the side chains after the device is in position on the tire thus facilitating the placing of the chain on the tire because it can be coupled while relatively loose and afterwards tightened.

A further object is to provide an improved construction of cross chains which gives the maximum of traction and prevents skidding in any direction.

A further object is to provide cross chains with improved means for coupling them to the side chains, so that the cross chains can be readily removed and replaced as occasion may require.

A further object is to provide an antiskid chain of the character described which can be manufactured and sold at a relatively low price and which will most efficiently perform the functions for which it is intended.

With these and other objects in view, the invention consists in certain novel features of construction and combinations and arrangements of parts which will be more fully hereinafter described and pointed out in the claims.

In the accompanying drawings—

Figure 3 is a perspective view of the central link of a cross chain;

Figure 4 is a perspective view of one of the other links of the cross chain;

Figure 5 is a perspective view illustrating the coupling link for connecting the cross chain to the side chain link;

Figure 6 is a view in elevation illustrating my improved take-up device in extended position;

Figure 7 is a similar view showing the take-up device in its contracted and normal operative position;

Figure 8 is a view in side elevation illustrating the side chain locking mechanism;

Figure 9 is a view in elevation at right angles to Figure 8, showing the parts in edge view.

Figure 1:
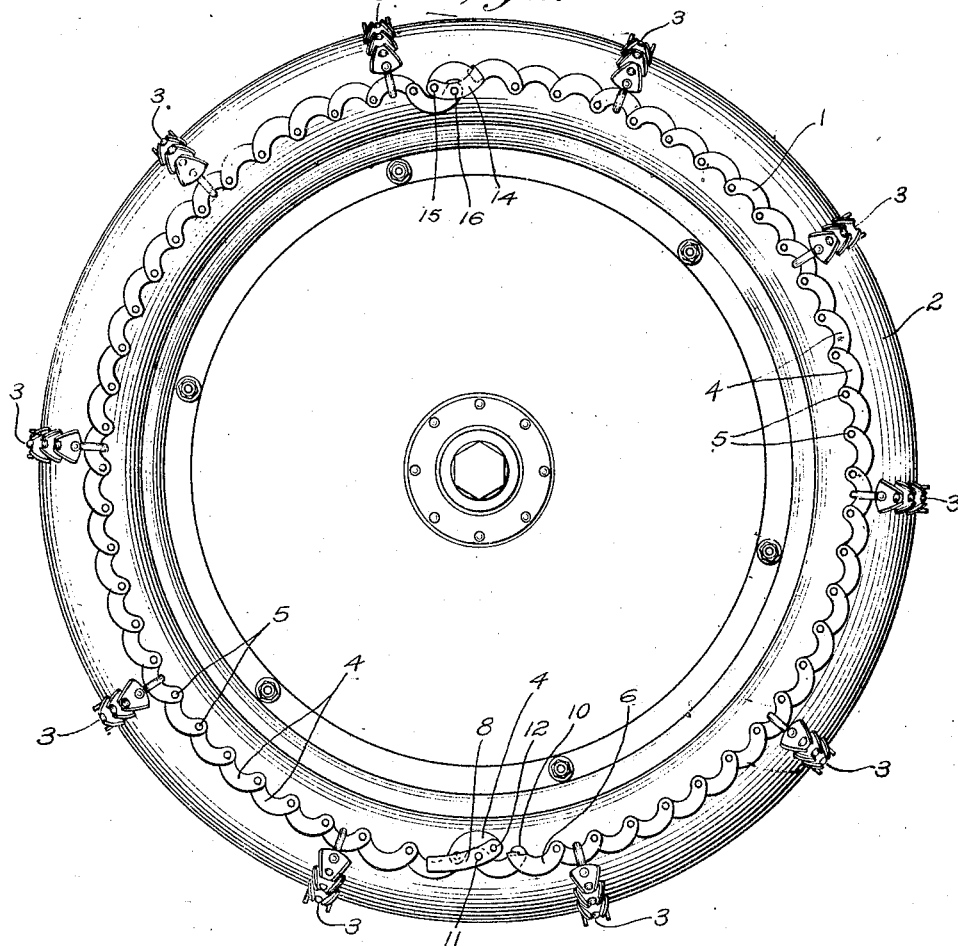
Figure 1 is a view in side elevation of a wheel showing my improved anti-skid chain in operative position on the shoe or tire thereof.

My improved anti-skid chain comprises a pair of side chains 1 which are precisely alike and positioned at opposite sides of a tire or shoe 2, and connected at suitable intervals by cross chains 3. It is to be understood that the side chains and the cross chains provide sufficient slack to allow a certain amount of movement of the antiskid chain as a whole around the periphery of the tire or shoe to give the best results, as is well known in this art. The side chains 1 are composed of a series of flat arcuate links 4, the ends of adjacent links overlapping and pivotally connected by rivets 5. These links may be stamped from sheet metal of proper thickness and strength and present a relatively smooth surface to the side of the shoe or tire. The coupling means for the ends of the side chains is illustrated in detail in Figures 8 and 9, and comprises end links 6 and 7 and a lever 8. The end link 6 is of bifurcated form, the two links or portions thereof being integrally connected by a cross tongue 9 which is adapted to be engaged by a hook 10 on the free end of the link 7. The lever 8 above referred to is pivotally connected to the end of one of the ordinary chain links 4, and at a point adjacent said pivot is pivotally connected to the end of link 7, as shown at 11, so that by swinging the lever 8 on its pivot 12 it will cause a longitudinal movement to be imparted to the link 7. To couple the ends of the chain, the hook end 10 of link 7 is positioned through the bifurcated link 6 and engages the connecting portion 9 thereof. The lever 8 is then swung to the left, as shown in Figure 8, until a laterally projecting locking lip 13 thereon can be forced over the edge of one of the chain links 4, when the ends of the chain will be securely coupled.

My improved take-up mechanism is illustrated in detail in Figures 6 and 7, and while I may employ any number of these take-up mechanisms in each side chain, I have illustrated but one in each chain and located such take-up mechanism directly opposite to the chain and locking means. This take-up mechanism comprises a lever 14 which is pivotally connected at one end to one of the chain links 4, as shown at 15, and at a point near 15 is pivotally connected to the end of another chain link 4, as shown at 16. Thus when the lever 14 is swung on its pivot 15 it causes the ends of the chain to be drawn together or separated, as the case may be. Figure 6 shows the device in position to allow a full extension of the chain. When it is desired to tighten the chain the lever 7 is swung on its pivot to the right of Figure 6 to bring an inwardly projecting tongue 17 thereon in position between two adjacent links 4 and back of the rivet 5 connecting them. In other words, this lever is swung beyond the line of pivots so that it will securely hold and maintain the chain in its tightened form.

Figure 2:
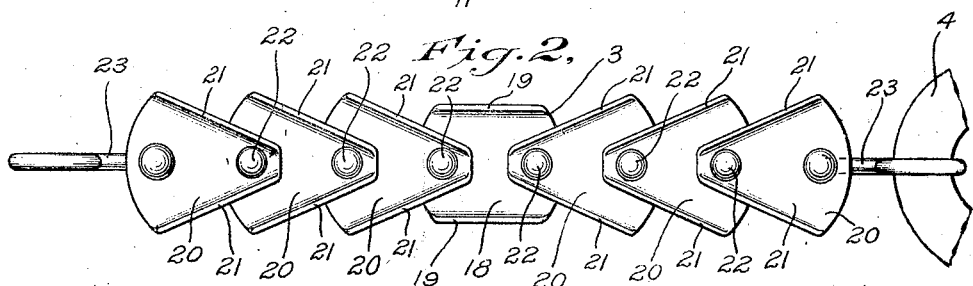
Figure 2 is an enlarged plan view of one of the cross chains.

In Figures 2, 3, 4 and 5, I illustrate in detail the construction of one of my improved cross chains 3. Each cross chain has a central link 18 which is relatively flat and provided with side flanges 19. The other links 20 of the cross chain are alike and are of general triangular form with outwardly turned flanges 21 at their side edges. The narrower inner ends of adjacent links 21 are positioned on top of the wider ends of the links and connected by rivets 22, and the links 20 adjacent link 18 overlap the ends of link 18 and likewise connect by rivets 22. These rivets 22 have sufficient play in the openings in the links receiving them to permit of all necessary movements, and the heads of said rivets at the outer portions of the cross chains are of sufficient height to sustain a portion of the wear in conjunction with the flanges 19 and 21 to assist in obtaining perfect traction and preventing skidding. To couple the cross chains 3 to the side chains 1, I provide coupling members 23, one of which is illustrated in perspective in Figure 5. Each coupling member is composed preferably of relatively strong wire having a head 24 at one end so that when this coupling member is positioned through an opening 25 in an end link of the cross chain 3 the head 24 will hold the parts together and will function as one of the rivet heads 22. The other end of the coupling member is bent upon itself, forming a loop 26, which is positioned about one of the side links 4 and then bent tightly together so as to effectually secure the parts and yet permit of necessary movements. When it is desired to remove the cross chain it is simply necessary to spread the loop 26 far enough to permit its release from one of the side links, as will be readily understood.

It will be noted that in constructing my improved chain I can form all of the links of the side chains and all of the links of the cross chains of relatively heavy sheet metal which can be stamped or otherwise shaped so that the device as a whole can be manufactured and sold at a reasonably low price. Furthermore the links will present relatively smooth surfaces to the shoe or tire and prevent injury to the same and will effectually overcome the possibility of skidding.

It is, of course, to be understood that the invention is not limited to any particular number of links in the side chains, any number of take-up devices, or any particular number of cross chains, as this will depend altogether upon the size of the tire and the desire of the trade.

In describing my improved device I have referred to the links 4 of the side chains 1 as being arcuate and it will be noted that most of the links of the chain are curved outwardly when in position on the tire, and that certain of the links adjacent the locking means and adjacent the take-up mechanism are oppositely positioned so as to provide space for the accommodation of pivotal connections in coupling or taking up the slack in the chain, in other words, the links are so arranged to require a minimum of space and to prevent a plurality of thicknesses or uneven surfaces which might chafe the tire.

I have also referred to the links of the cross chains as being relatively flat. This is true with the exception that these links at their outer ends are slightly beveled or tapered to give a more perfect fit to the rounded surface of the shoe when the links are properly coupled and placed thereon. This is clearly shown in Figures 3 and 4 although it is evident that this may be somewhat exaggerated and needs to be relatively slight in a full size in actual construction.

Various slight changes and alterations might be made in the general form of the parts described without departing from my invention, and hence I do not limit myself to the precise details set forth but consider myself at liberty to make such slight changes and alterations as fall within the spirit and scope of the appended claims.

I claim:

1. A device of the character described, comprising side chains and cross chains connecting them, said cross chains composed of relatively flat metal links overlapping each other, and flanges at the edges of the links, the intermediate links having relatively parallel sides and the other links of general triangular form with their inner shorter ends overlapping the wider ends of adjacent links.

2. A device of the character described, comprising side chains and cross chains connecting them, said cross chains composed of relatively flat metal links overlapping each other, and flanges at the edges of the links, the intermediate links having relatively parallel sides and the other links of general triangular form with their inner shorter ends overlapping the wider ends of adjacent links, and rivets connecting the links, the head of the rivets co-operating with the flanges of the links and forming anti-skid devices.

3. A cross chain, comprising a central relatively flat link having parallel side edges and upsetting flanges at the edges thereof, a series of triangular links at both sides of the intermediate link, said triangular links having their smaller ends overlapping the wider ends of adjacent links and also the intermediate link, rivets projected through the overlapping links, side flanges at the side edges of the triangular links, and coupling devices at the ends of the cross chain for removable attachment to the side chains.

4. A device of the character described, comprising side chains and cross chains connecting them, said side chains composed of a series of arcuate relatively flat links overlapping and pivotally connected, means for locking the ends of the side chains, and take-up means on the side chains.

5. A side chain, comprising arcuate links overlapping and pivotaly connected, a bifurcated link at one end of the chain, a lever pivotally connected to the other end of the chain, a link pivotally connected to the lever and having a hook-shaped end to engage the bifurcated link, and means on the lever for locking it against one of the links of the chain.

6. A side chain, comprising arcuate links overlapping and pivotally connected, a take-up pivotally connected at one end to one link and between its ends to an adjacent link, and a locking tongue on the free end of said take-up lever adapted to be positioned between two adjacent links.

7. A cross chain for a non-skid tire formed from a plurality of articulated links, each of which has the shape of a truncated isosceles triangle, and has the extreme side portions bent at right angles to the body portion so as to form flanges.

8. A cross chain for non-skid tire chains comprising a plurality of articulated links having sides converging towards the middle of the chain, said converging sides being provided with flanges extending perpendicularly to the body portion of the link.

9. An anti-skid member for tires having double sets of narrow treads converging towards the median plane of the tire and forming between them recesses having laterally directed open ends.

10. An anti-skid device for tires including a cross member formed of a plurality of flexibly connected plates, the said plates having formed thereon a plurality of tread members shaped as narrow substantially rectilinear ribs inclined to the median plane of the tire with which the device is used, the ribs being arranged in echelon with the ribs at one side of the median plane of the tire oppositely inclined to the ribs at the other side of the median plane of the tire.

11. An anti-skid device for tires constructed as set forth in claim 10 in which two ribs are employed at each side of the median plane of the tire, both at the forward and rearward edges of the cross member, the ribs at the forward side of the cross member at one side of the median plane of the tire being inclined in the same direction as the ribs at the rearward side of the cross member at the other side of the median plane of the tire.

12. An anti-skid device for tires including a cross member formed of a plurality of flexibly connected plates, the said plates each having formed thereon at both front and rear edges a plurality of treads shaped as narrow substantially rectilinear ribs, the ribs being arranged in spaced pairs, the ribs of each pair being inclined relative to one another and the median plane of the tire with which the device is used.

CHARLES A. HARTFIEL.